(12) United States Patent
Bazinski et al.

(10) Patent No.: US 6,171,041 B1
(45) Date of Patent: Jan. 9, 2001

(54) SCREW RETAINING MECHANISM

(75) Inventors: Stephen Norman Bazinski, Amherstburg (CA); Albert James Dapoz, Sterling Heights, MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/431,316

(22) Filed: Nov. 2, 1999

(51) Int. Cl.⁷ .............................. F16B 35/00; F16B 35/04; F16B 37/04

(52) U.S. Cl. ..................... 411/366.1; 411/180; 411/424; 411/903; 411/908

(58) Field of Search ................................. 411/82.2, 180, 411/301, 302, 366.1, 424, 902, 903, 908, 909; 403/408.1

(56) References Cited

U.S. PATENT DOCUMENTS

| | | | |
|---|---|---|---|
| 3,477,337 | * 11/1969 | Racki | 411/903 X |
| 3,687,493 | * 8/1972 | Lock et al. | 411/903 X |
| 4,154,276 | * 5/1979 | Wesner | 411/82.2 |
| 4,928,451 | 5/1990 | Reigstad et al. | |
| 4,987,714 | * 1/1991 | Lemke | 411/903 X |
| 5,133,630 | * 7/1992 | Hughes | 411/180 X |

* cited by examiner

Primary Examiner—Neill Wilson
(74) Attorney, Agent, or Firm—Larry I. Shelton

(57) ABSTRACT

An article of manufacture in the form of a screw retaining mechanism for assembling a pair of objects. The mechanism comprises a tubular wall of given thickness defining a plastic boss on one object; a screw having a threaded shank secured in the boss by grooves complementary to the screw threads, the screw having a head clamping the other object to the first object; and a heat shrunk sheath residing on the screw threads and shank to act as a threaded interference fit film between the screw threads and the boss grooves, the sheath having metal wires weavingly embedded into the sheath to extend at least generally parallel to the axis of the tubular wall.

16 Claims, 3 Drawing Sheets

SCREW RETAINING MECHANISM

TECHNICAL FIELD

This invention relates to the technology of applying screw fasteners to plastic bosses, and more particularly to metal screws that are self-tapping to create threads in plastic bosses.

BACKGROUND OF THE INVENTION

Plastic components, particularly automotive dashboards or trim assemblies having bosses that receive self-tapping metal screws to apply a clamping load to a support that secures the component in position. In virgin plastic bosses which have the screws applied for the first time, the interfacial friction between the screw threads and the tapped grooves of the plastic boss sometimes may not be sufficiently high to prevent loosening of the screws over long periods of vibration.

More significantly, when the screws are improperly torqued during installation, the tapped grooves within the plastic may be stripped so that there is little holding power for providing the desired clamping load. Since the plastic component usually has bosses which are tubular with a wall thickness generally in the range of 1.5–2.0 mm, there is little mass left to either install a larger self-tapping screw that would create new and larger thread grooves, or install an expandable anchor insert in the stripped hole with sufficient boss stiffness to promote gripping by the screw.

SUMMARY OF THE INVENTION

A primary object of this invention is to provide an improved screw retaining mechanism that creates a threaded interference fit between the screw and receiving object.

It is also an object to provide a method to more effectively secure a screw in a plastic object, particularly objects having plastic bosses of controlled wall thickness that risk having their holes stripped of threaded grooves.

The invention, in a first aspect, is an article of manufacture in the form of a screw retaining mechanism for assembling a pair of objects. Such mechanism comprises: (a) a tubular wall of given thickness defining a plastic boss on one object; (b) a screw having a threaded shank secured in the boss by grooves complementary to the screw threads, the screw having a head clamping the other object to the first object; and (c) a heat shrunk sheath residing on the screw threads and shank to act as a threaded interference fit film between the screw threads and the boss grooves, the sheath having metal wires weavingly embedded into the sheath to extend at least generally parallel to the axis of the tubular wall.

The invention, in a second aspect, is a method of securing a screw in a plastic object, comprising: (a) providing the plastic object with an integral tubular wall to define a plastic boss, the tubular wall having an interior diameter; (b) providing a metallic screw having a shank with threads extending from the shank to define a thread diameter greater than the tubular wall interior diameter; (c) heat shrinking a polyethylene film containing moldable, hard wires onto said screw shank and threads; and (d) torquing the screw shank containing the heat shrunk film into the boss to create a threaded interference fit with the tubular wall whereby the screw is ready to apply a clamping load.

DETAILED DESCRIPTION AND BEST MODE

Figure 1:
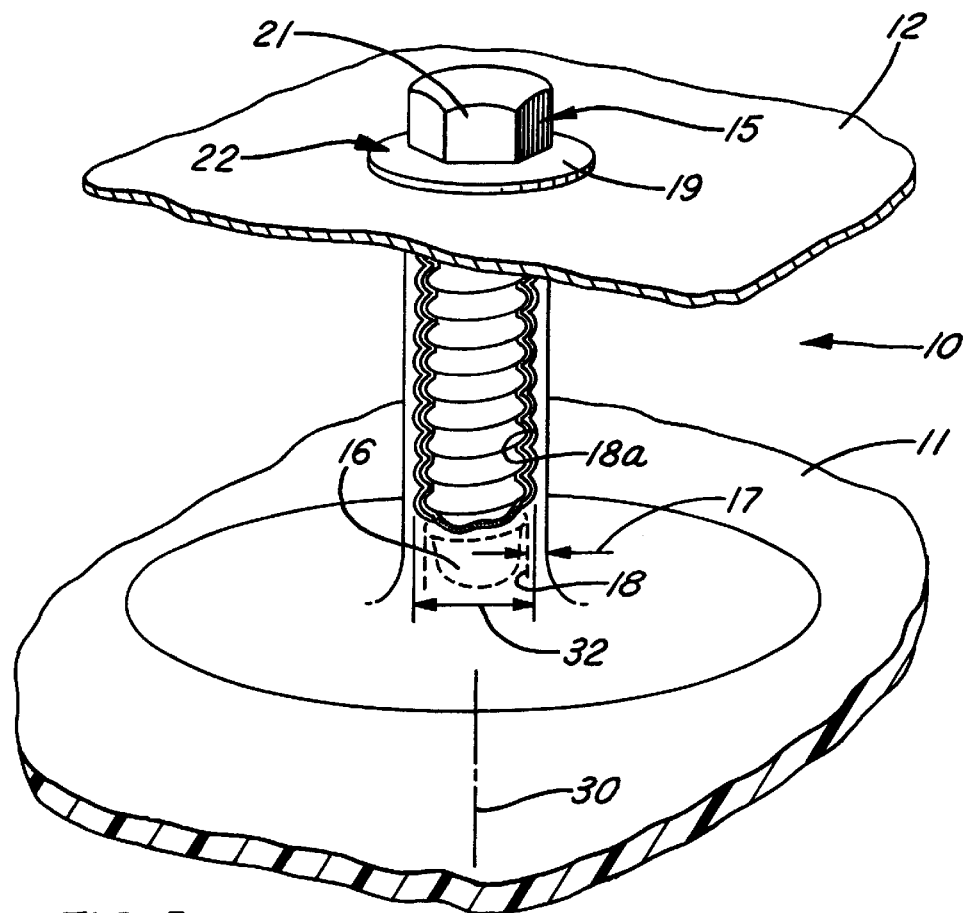
FIG. 1 is a perspective view of an assembly employing the screw retaining mechanism of this invention.

As shown in FIG. 1, a screw retaining mechanism 10 of this invention is used to assemble a pair of objects 11 and 12. Object 11 is a portion of a plastic automotive dashboard having an integral tubular wall 13 extending therefrom to define a hollow plastic boss for receiving a screw 14. The screw 14 has a head 15 which, when the screw shank 16 is secured in the boss, applies a clamping load to the other object 12 such as a metal support. One of the problems with relatively thin walled bosses, such as those having tubular walls with a thickness 17 in the range of 3–5 mm, is that if the complementary threaded grooves in the interior surface 18 of the boss are stripped or damaged, it is extremely difficult to repair such condition that will permit the same screw to attain its designed clamping load. Larger screws or anchor inserts are not helpful because of the relative thinness of the tubular wall.

Figure 2:
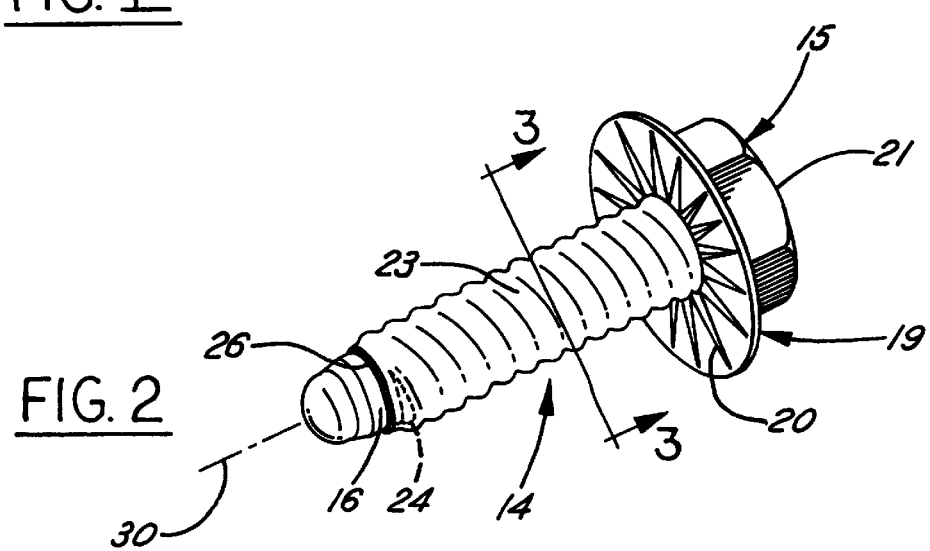
FIG. 2 is a perspective view of a screw adapted to this invention with a heat shrunk film over the screw threads and screw shank, the film carrying embedded, woven wires.
Figure 3:
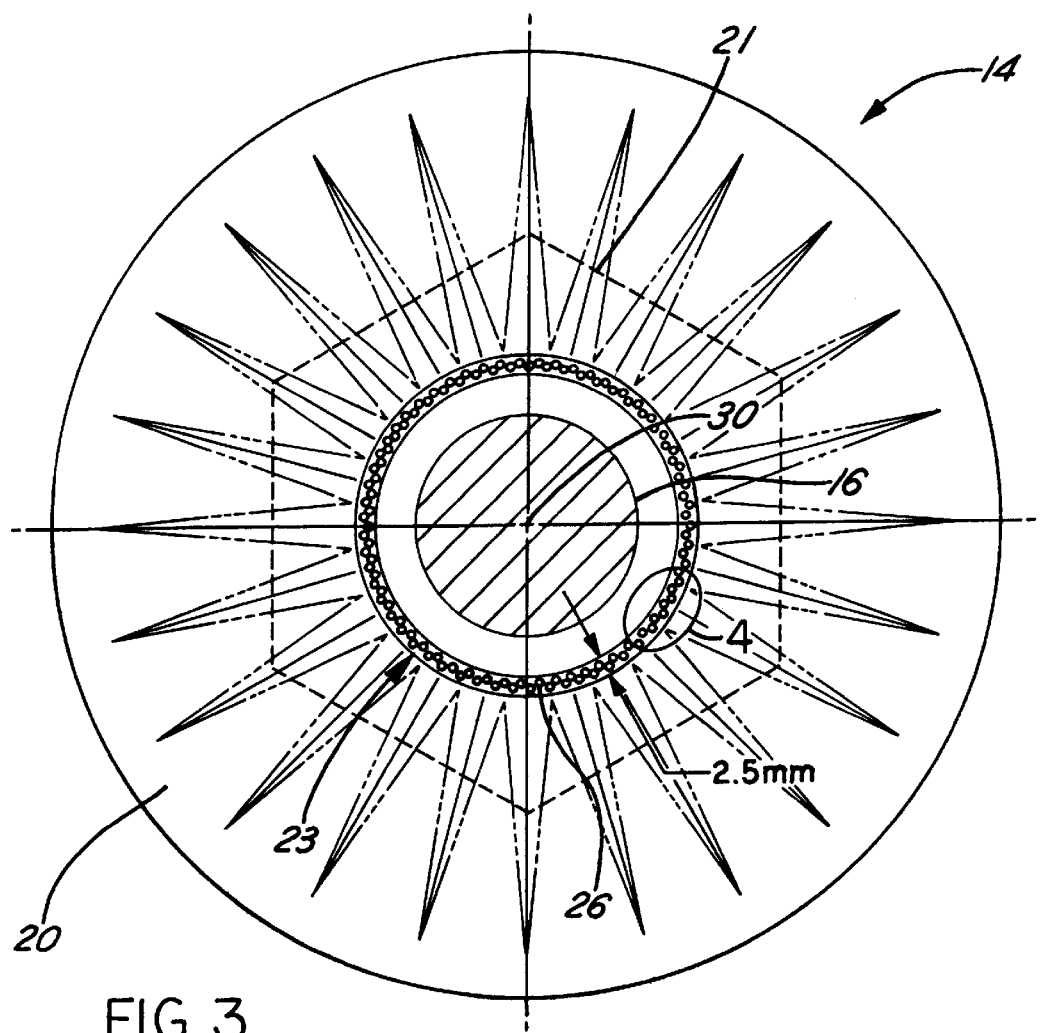
FIG. 3 is a sectional view taken along line 3—3 of FIG. 2.
Figure 4:
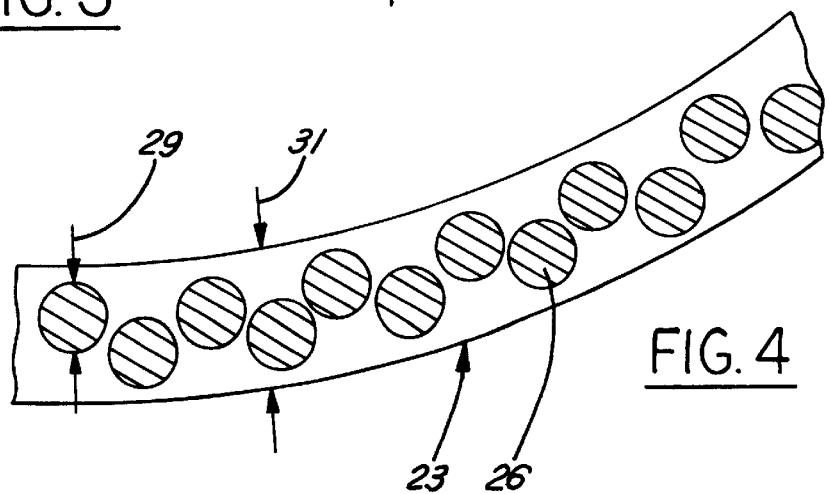
FIG. 4 is a greatly enlarged view of a portion of FIG. 2.
Figure 5:
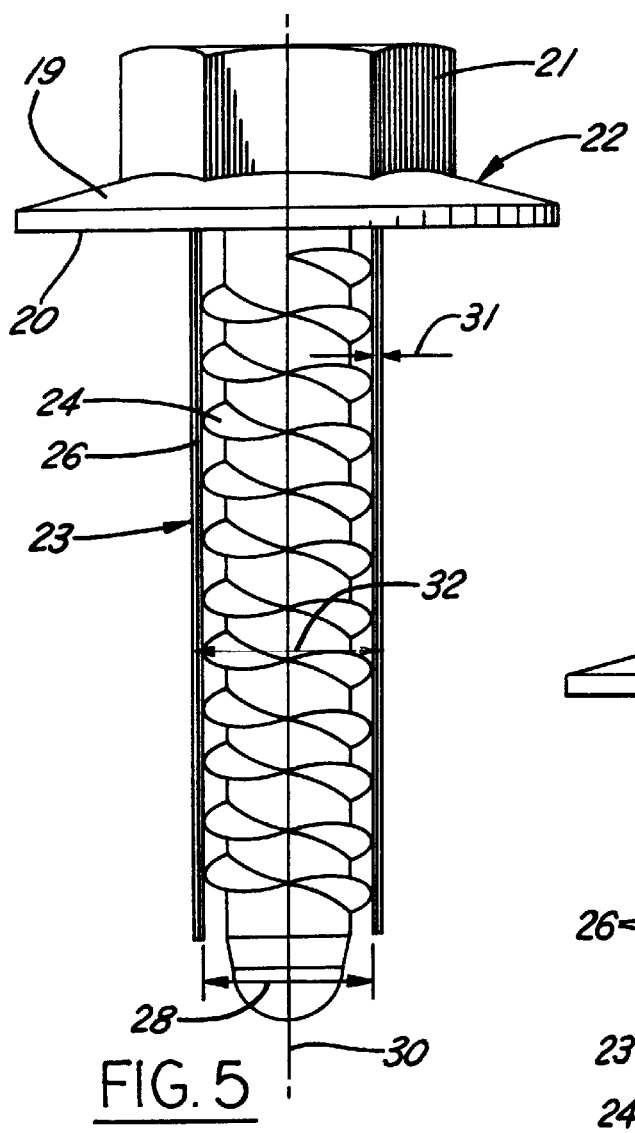
FIGS. 5 and 6 are sequential elevational views of a screw undergoing process steps according to this invention and showing the heat shrinkable film in cross section.

As shown in FIGS. 1 and 2, the screw has a clamping head 15 comprised of a flange 19 serrated on its underside 20 to grippingly engage the metal object 12, and has an integral torquing nut 21 on its other top side 22. The screw 14, as shown in FIG. 2, is provided with a heat shrunk sheath 23 residing on the screw threads 24 and shank 16. The sheath or film 23 is comprised of plastic material that shrinks upon exposure to heat in the range of a ratio from 2 to 1. Exemplary plastic materials that will do so are polyethylene or polyvinylidene fluoride. The sheath or film 23 is prepared during fabrication to contain multiple cold rolled narrow steel wires 26. It is desirable to form the shrink wrap material in a tubular form having an interval diameter 32 (as shown in FIG. 5) so that the tubular material may be slipped over the outer diameter 28 of the threads in a touching relationship as shown prior to being heat shrunk. The diameter 29 of the embedded steel wire is preferably in the range of 0.001–0.005 inches and the wires are spaced close together in a knitted or closely woven manner with the radial spacing between the wires being about ⅛–¼ the diameter of the wire as shown in FIG. 4 while the wire may overlap in a circumferential direction.

It is advantageous if the wires 26 are placed in the shrink wrap material or sheath 23 so as to extend generally parallel along one direction, preferably the axis of the tube. The shrink wrap material can then be placed over the threaded shank with the embedded wires extending at least generally parallel to the axis 30 of the shank or the axis of the interior of the boss. The sheath or film preferably has a uniform thickness 31 of about 2.5 mm which is slightly thicker than the diameter 29 of the embedded wires, which generally are 2–3 times the diameter of the wires.

The cold rolled wires 26 are moldable under the torquing pressure of turning the screw 14 within the boss 13 to create a threaded interference fit between the screw threads 24 and screw shank 16 and the plastic boss 13. The boss 13 may have (i) pretapped complementary thread grooves 24 on its interior, ready to receive the proper sized screw, (ii) a tubular wall with an interior diameter 32 that is smaller than the diameter 28 of the screw threads 24 and has yet to be tapped with threaded grooves, or (iii) the tubular wall of the sheath has an interior diameter 32 close to the diameter of the screw threads 24 due to prior stripping or damage of the boss wall interior. The plastic boss may even have voids and over molding conditions in its interior. In either case, the shrink wrapped wire sheath will promote an improved threaded interference fit in such bosses.

Figure 6:
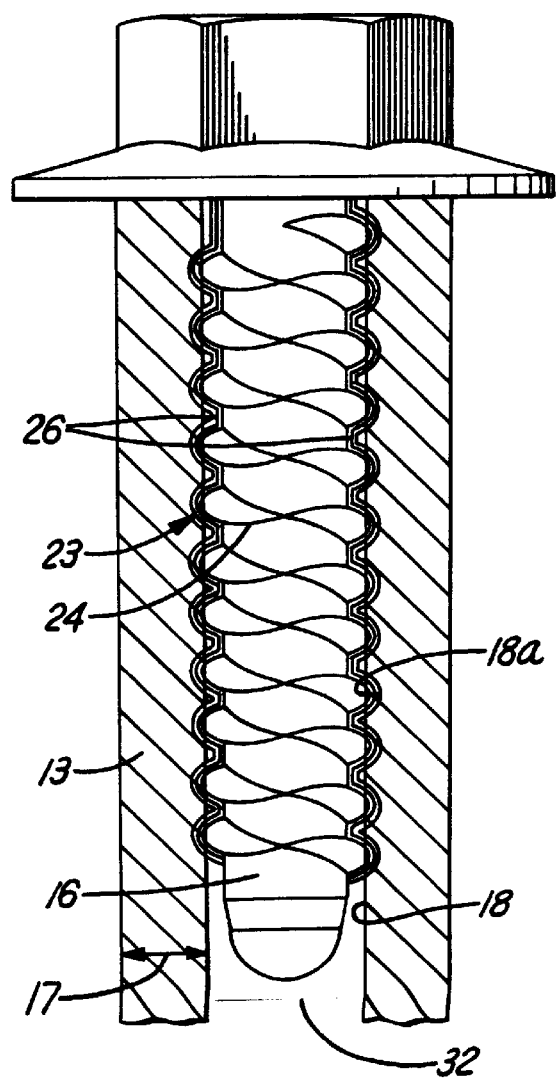

As shown in FIGS. 5 and 6, the method of securing a screw in a plastic object 11 starts with providing a plastic object 11 with an integral tubular wall to define a plastic boss 13 with the tubular wall having a predetermined interior diameter 32 and providing a metallic screw 14 having a shank 16 with threads 24 extending from the shank to define a thread diameter 28 greater than the tubular wall interior diameter 32. Next, a heat shrinking polyethylene film 23 containing moldable, hard wires 26 is slipped over and onto the outer diameter of the screw threads 24 and shank 16. The film is then subjected to heat, causing the polyethylene film to shrink and hug the contours of the thread and shank as shown in FIG. 6. Next, the film carrying screw is placed into the interior of the plastic boss assembled as in FIG. 1 so that the head of the screw can be torqued or turned to create a threaded interference fit with the interior of the tubular wall of the boss and thereby create a threaded interference fit between the interior of the boss and the screw sufficient to apply a clamping load to the two objects being assembled.

The heat shrunk film, as shown in FIG. 6, has a uniform shaped thickness in the range of 0.25 mm (0.007–0.009 inches). The embedded woven wires are readily molded to curve along the contours of the threads and shank due to the shrinking pressure of the film which imposes a force of about 30 to 80 psi. The sheath or film is thereby locked to the screw due to the combined irregular contours of the threads and shank. Such sheath or film provides an interference fit because it is adding a reinforcement layer to the inside of the boss and, additionally, provides a gripping surface between the threads and boss because of the higher frictional characteristic of the shrink wrap which is about two times greater than that between conventional screw threads and the boss. In comparison testing, the amount of torque to strip out the threads in a plastic boss existing state of the art screws would strip out at 2.0 Nm whereas the device of this invention required 2.2 Nm. In tensile pull tests, state of the art screws would pullout at 600 N whereas the device of this invention required 950 N to pull out. Many different plastic materials. Screws and clips were used in the above tryouts. The torque fall off for the device of this invention was equal to or better than a virgin screw.

While the invention has been shown and described in its preferred embodiments, it will be clear to those skilled in the arts to which it pertains that many changes and modifications may be made thereto without departing from the spirit scope of the invention.

We claim:

1. A screw retaining mechanism for assembling a pair of objects, such mechanism comprising:
    (a) a tubular wall of given thickness defining a plastic boss on one object;
    (b) a screw having a threaded shank secured in said boss by grooves complementary to said screw threads, said screw having a head clamping said other object to said first object; and
    (c) a heat shrunk sheath residing on said screw threads and shank to act as a threaded interference fit film between said screw threads and said boss grooves, said sheath having metal wires weavingly embedded into said sheath to extend at least generally parallel to the axis of said tubular wall.

2. The mechanism as in claim 1, in which the thickness of the heat shrunk film is 5–10% of said tubular wall thickness.

3. The mechanism as in claim 1, in which said tubular wall thickness is in the range of 1 mm. or greater and said sheath thickness is in the range of 0.007–0.009 inches.

4. The mechanism as in claim 1, in which said metal wires are comprised of cold rolled steel wire of SAE 1010 composition.

5. The mechanism as in claim 4, in which the diameter of said wires is in the range of 0.001–0.005 inches.

6. The mechanism as in claim 5, in which the spacing between the embedded wires is in the range of 1–3 times the diameter of said wires.

7. The mechanism as in claim 1, in which said sheath material is comprised of polyvinylidene flouride.

8. The mechanism as in claim 1, in which said one object is an automotive dashboard and other object is a metallic support for said dashboard.

9. The mechanism as in claim 8, in which said dashboard is a plastic component selected from the group consisting of polycarbonate, EBS, and polypropylene.

10. The mechanism as in claim 1, in which said sheath has a shrunk thickness of about 0.25 mm.

11. A method of securing a screw in a plastic object, comprising:
    (a) providing said plastic object with an integral tubular wall to define a plastic boss, said tubular wall having an interior diameter;
    (b) providing a metallic screw having a shank with threads extending from said shank to define a thread diameter greater than said tubular wall interior diameter;
    (c) heat shrinking a polyethylene film containing moldable, hard wires onto said screw shank and threads; and
    (d) torquing said screw shank containing said shrunk film into said boss to create a threaded interference fit with said tubular wall whereby said screw is ready to apply a clamping load.

12. The method as in claim 11, in which said * is comprised of anodized aluminum.

13. The method as in claim 11, in which in step (d) said clamping load is in the range of 1088 newtons.

14. The method as in claim 11, in which said polyethylene film thickness in the shrunk condition is ⅛ to ¼ the wall thickness.

15. The method as in claim 11, in which said moldable hard wires have a wire diameter of about 0.0005 inches.

16. The method as in claim 15, in which said wires are intertwined into a woven mesh.

* * * * *